United States Patent
Mei et al.

(10) Patent No.: US 9,225,568 B1
(45) Date of Patent: Dec. 29, 2015

(54) FSK DEMODULATOR

(71) Applicants: Wangsheng Mei, Suzhou (CN); Zhijun Chen, Suzhou (CN); Zhiling Sui, Suzhou (CN); Yan Xiao, Suzhou (CN)

(72) Inventors: Wangsheng Mei, Suzhou (CN); Zhijun Chen, Suzhou (CN); Zhiling Sui, Suzhou (CN); Yan Xiao, Suzhou (CN)

(73) Assignee: FREESCALE SEMICONDUCOTR, INC., Austin, TX (US)

( * ) Notice: Subject to any disclaimer, the term of this patent is extended or adjusted under 35 U.S.C. 154(b) by 0 days.

(21) Appl. No.: 14/694,927

(22) Filed: Apr. 23, 2015

(30) Foreign Application Priority Data

Dec. 9, 2014 (CN) .......................... 2014 1 0857774

(51) Int. Cl.
*H04L 27/14* (2006.01)
*H04L 27/156* (2006.01)

(52) U.S. Cl.
CPC ................... *H04L 27/1563* (2013.01)

(58) Field of Classification Search
USPC .................................. 375/336, 334, 328, 211
See application file for complete search history.

(56) References Cited

U.S. PATENT DOCUMENTS

| | | | | |
|---|---|---|---|---|
| 5,550,505 | A | | 8/1996 | Gaur, Jr. |
| 6,160,857 | A | * | 12/2000 | Yang .................... H04L 27/1563 329/300 |
| 2006/0193402 | A1 | * | 8/2006 | Lee .................... H04L 27/2014 375/336 |
| 2007/0147544 | A1 | | 6/2007 | Akahori |
| 2011/0129034 | A1 | | 6/2011 | Akahori |
| 2014/0003472 | A1 | * | 1/2014 | Ash .................... H04L 27/1563 375/211 |
| 2014/0140445 | A1 | * | 5/2014 | Singh .................... H04L 27/14 375/328 |

* cited by examiner

*Primary Examiner* — Eva Puente
(74) *Attorney, Agent, or Firm* — Charles Bergere

(57) ABSTRACT

A demodulator suitable for demodulating binary FSK signals having a small difference between carrier frequencies uses a counter-timer technique for timing a fixed number FSK cycles and comparing a count value with a threshold when a frequency change is expected. By grouping a number of FSK pulses (or cycles) together in one measurement, speed requirements on the system clock used for the counter/timer measurements can be relaxed and tolerance to noise is also improved. The demodulator is particularly suitable for wireless charging applications.

14 Claims, 2 Drawing Sheets

FSK DEMODULATOR

BACKGROUND OF THE INVENTION

The present invention relates generally to demodulating binary information and, more particularly to demodulation of frequency shift keying (FSK) transmissions.

Frequency shift keying (FSK) is a frequency modulation scheme whereby digital information can be transmitted by discrete changes of a carrier wave frequency. A simple form of FSK is the so-called binary frequency shift keying (BFSK) where a logical "1" is represented by a first frequency (F1, say) of a carrier wave and a logical "0" is represented by a second frequency (F2) of the carrier wave. One known method for de-modulating binary FSK signals uses a comparator to resolve the incoming modulated waveform into a square wave by comparing the received signal amplitude with a threshold. A counter/timer circuit monitors the frequency of state transactions of the square waves in order to determine a count of transitions per time period. In an alternative method, the counter/timer circuit measures an amount of time taken to complete a pre-defined number of transitions. A decision device selects a frequency from a predetermined set of frequencies which most closely corresponds to the measurement, and decodes a bit value '0' or '1' corresponding to the selected frequency. This solution works satisfactorily when there is an appreciable difference between the frequencies F1 and F2 so that a typical counter/timer clock frequency running at around 40 MHz would be sufficient for resolving them. However, for FSK frequencies which are much closer together, such as that defined by the Wireless Power Consortium WPC-QI standard where a difference of 31.25 ns is specified, employing the conventional circuitry described above would require a counter/timer clock running at around 128 MHz. This is very difficult to implement with current microcontroller technology. A modulation scheme specified by the 'Wireless Power Consortium WPC-QI standard specifies that for a given number of cycles (e.g., 512 cycle) of the received FSK signal comprising one bit, if the carrier wave stays at a constant frequency (F1 or F2), a logical "0" is represented in such period; otherwise if the carrier wave switches its frequency (e.g., from F1 to F2 or F2 to F1 in the middle of this given period), then a logical "1" is represented in this period.

Thus it would be advantageous to provide a counter/timer-based FSK demodulator that can operate with a system clock frequency that is readily achievable with existing microcontroller technology and that is compatible with the Wireless Power Consortium standard and protocol.

BRIEF DESCRIPTION OF THE DRAWINGS

The present invention, together with objects and advantages thereof, may best be understood by reference to the following description of preferred embodiments together with the accompanying drawings in which.

DETAILED DESCRIPTION OF PREFERRED EMBODIMENTS

Figure 1:
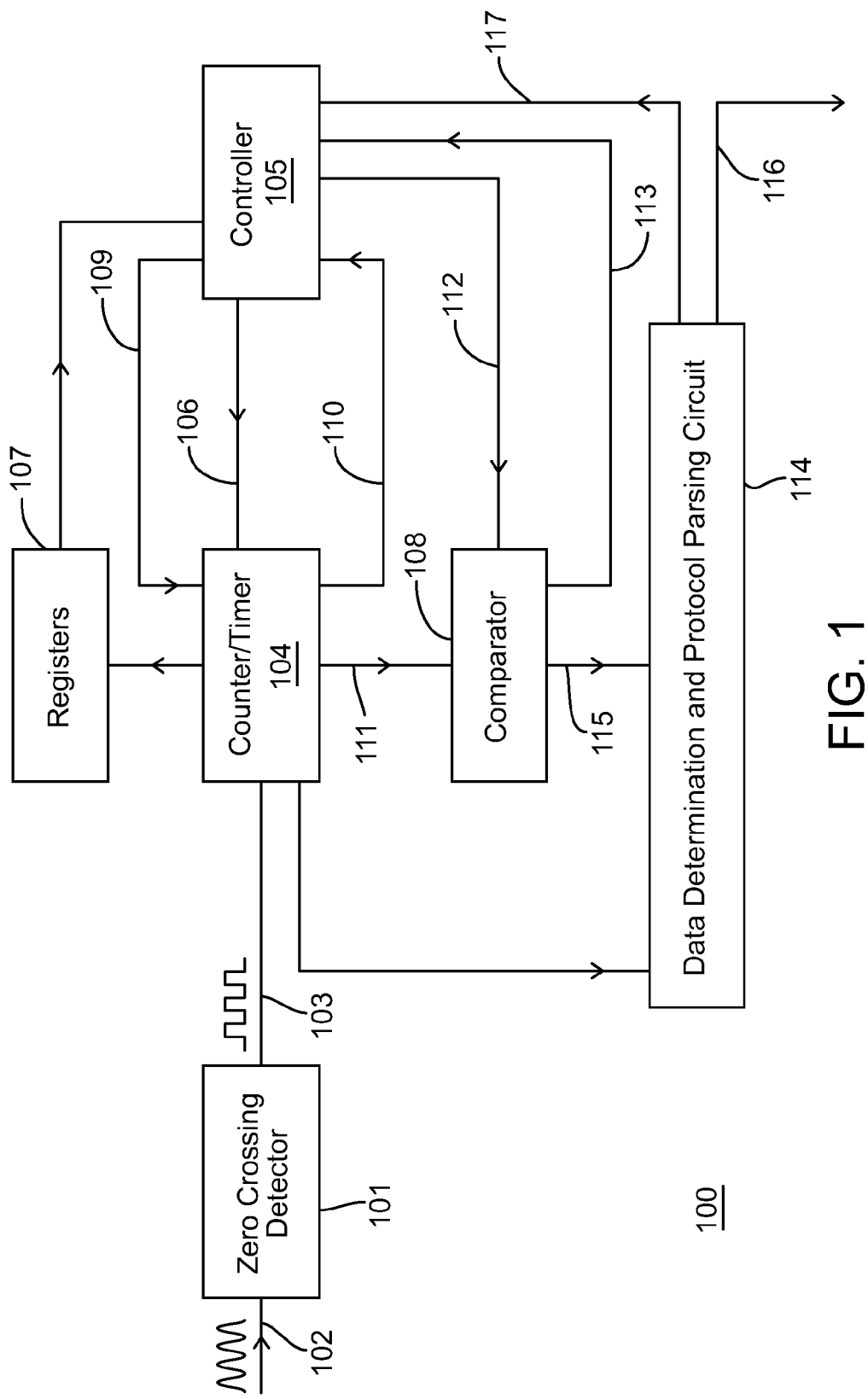
FIG. 1 is a simplified schematic block diagram of a demodulator in accordance with an embodiment of the invention.

The detailed description set forth below in connection with the appended drawings is intended as a description of presently preferred embodiments of the invention, and is not intended to represent the only forms in which the present invention may be practised. It is to be understood that the same or equivalent functions may be accomplished by different embodiments that are intended to be encompassed within the spirit and scope of the invention. In the drawings, like numerals are used to indicate like elements throughout. Furthermore, terms "comprises," "comprising," or any other variation thereof, are intended to cover a non-exclusive inclusion, such that module, circuit, device components, structures and method steps that comprises a list of elements or steps does not include only those elements but may include other elements or steps not expressly listed or inherent to such module, circuit, device components or steps. An element or step proceeded by "comprises . . . a" does not, without more constraints, preclude the existence of additional identical elements or steps that comprises the element or step.

In one embodiment, the present invention provides a frequency shift keying (FSK) demodulator for decoding a binary signal encoded in a received FSK signal. The demodulator comprises: a first comparator for processing the received FSK signal to produce a FSK pulsed waveform comprising a succession of pulses wherein one bit of data comprises 'N' pulses; a counter/timer, operably coupled to the first comparator, for receiving the FSK pulsed waveform and for determining measured count values of a duration of a pre-chosen number, n, where n is less than N, of consecutive pulses of the FSK pulsed waveform; and a second comparator, operably coupled to the counter/timer, for receiving the measured count values and for comparing the measured count values with a pre-determined threshold value and for outputting a bit value of '0' or '1' depending on the comparison.

In another embodiment, the present invention provides a method for demodulating a frequency shift keying (FSK) signal, the method comprising: processing, in a first comparator, the FSK signal to produce a FSK pulsed waveform comprising a succession of pulses wherein one bit of data comprises 'N' pulses; in a counter/timer, receiving the FSK pulsed waveform and determining measured count values of a duration of a pre-chosen number, n, where n is less than N, of consecutive pulses of the FSK pulsed waveform; and in a second comparator, comparing the measured count values with a pre-determined threshold value, and selecting a bit value of '0' or '1' depending on the comparison for outputting as a bit stream.

In one embodiment, comparing the measured count values with the pre-determined threshold is performed only when a change of frequency of the FSK waveform is expected.

Advantageously, by grouping a number of FSK pulses (or cycles) together in one measurement, the present invention relaxes the speed requirements on the system clock used for the counter/timer measurements. Restricting the number of comparisons made by the second comparator also improves tolerance to noise. Furthermore, the invention permits parsing an FSK-modulated message packet using few software iterations and in a cost effective manner.

Referring now to FIG. 1, a demodulator 100 for demodulating FSK signals is shown. A zero crossing detector 101 receives a 'raw' binary FSK modulated signal on line 102 and uses conventional techniques to convert the received signal to a pulsed FSK waveform which it outputs on line 103. The 'raw' signal received on line 102 generally comprises a sinusoidal waveform. In one embodiment, the zero crossing detector typically includes programmable hysteresis control and a filter function. Typically, the zero crossing detector processes the received signal into a square wave signal by comparing the received signal with a voltage level and creating a 'high' signal when an amplitude of the received signal is above the voltage level, and a 'low' signal when the amplitude of the received signal is below the voltage level. A counter/timer module 104 is operably coupled to the zero crossing detector 101 and receives the pulsed FSK waveform on line 103. The counter/timer module 104 is also operably coupled to a controller 105 from which it receives a system clock signal on line 106. The counter/timer module 104 is also operably coupled to registers 107 and to a comparator 108. The controller 105 is operably coupled to the registers 107 and can retrieve information therefrom. In one embodiment, the registers are configured directly by the CPU via software instructions. The controller 105 can send the counter/timer module 104 control signals on line 109 and also receive interrupt signals from the counter/timer module 104 on line 110. The comparator 108 receives measured count values from the counter/timer module 104 on line 111. The comparator 108 is also operably coupled to the controller 105 and receives therefrom a threshold value on line 112 and is capable of generating and sending an interrupt signal to the controller 105 on line 113. A data determination and protocol parsing circuit 114, which operates in accordance with conventional techniques, receives a sequence of bit values (i.e., a logical '0' or '1') from the comparator 108 on line 115 and outputs on line 116 a parsed data stream. In one embodiment, the data determination and protocol passing circuit 114 generates an interrupt signal on line 117 for application to the controller 105. The data determination and protocol parsing circuit 114 is also operably coupled to the counter/timer 104.

In one exemplary mode of operation of the demodulator of FIG. 1, encoded binary FSK signals are received on line 102. One bit of data comprises a predefined number 'N' of FSK cycles. The Wireless Power Consortium WPC-QI standard defines this as 512 FSK cycles and one byte (or package) can comprise either 8 bits or 11 eleven bits. Further, a frequency transition (from F1 to F2 or F2 to F1) happens in the middle of the 1 bit data FSK carrier cycles. Thus, if the FSK carrier frequency changes at this point (ie. the 256th cycle), then a logical "1" is being sent and if during the entire (single bit) 512 cycles no significant frequency change occurs, then a logical "0" is being sent. In both cases, the received FSK signal changes its frequency at the 512th cycle signifying the finish of a one-bit data transfer. In this example, F1 and F2 are relatively close in frequency, for example 200 KHz and 110 KHz which are typical choices in the WPC-QI standard. Also, in conformity with the WPC-QI standard, a whole package message (or one byte) (encoded in the FSK signal) comprises 11 bits. Similarly, one bit comprises 512 FSK cycles and a frequency change (from F2 to F1 or F1 to F2) can occur in the middle of each bit of 512 cycles. The FSK signal on line 102 is processed by the zero crossing detector 101 so that a square wave FSK signal is received by the counter/timer module 104 on line 103. Initially, it is decided, in the controller 105 how many incoming cycles 'n' of the square wave FSK waveform are to be grouped together for measurement. Say, in one example, eight cycles are to be grouped and their total duration measured in terms of system clock cycle count values in the counter/timer module 104. This information concerning the grouping of eight FSK cycles is conveyed to the counter/timer module on line 109. The controller 105 also sets the system clock frequency. In this example, the system clock frequency is 48 MHz which is sufficient to resolve the small frequency difference between F1 and F2 when multiple cycles are measured in the counter/timer module 104 and easily achievable with current technology. The system clock is received by the counter/timer module on line 106. The controller 105 also sets a threshold value and a comparison time window both of which are notified to the comparator 108 on line 112. This ensures that the comparator compares count values which are output from the counter/timer module 104 on line 111 with the set threshold value only at those times when it is expected that a frequency change (between F1 and F2) will occur, for example, at the mid-point of a single bit. It will be understood, as mentioned above, that a frequency change also occurs at the end of a single bit; that is on the 512th cycle in accordance the WPC-QI protocol, for example. The advantage of making comparisons only during a defined time window saves on power consumption. The counter/timer can also be disabled at times when no frequency changes between F1 and F2 are expected for further power savings. Further, any noise or jitter on the FSK signals occurring outside the window is ignored. Counter values that are determined by the counter/timer module 104 are transferred to the registers 107 where they can be accessed by the controller 105 and also are output to the comparator 108 on line 111. The total number of FSK cycles processed is reported by the counter/timer module 104 to the data determination and parsing circuit 114. For every eight cycles of the square wave FSK signal, the counter 104 generates a count value indicative of the duration of the eight cycles. This duration will vary depending on whether or not the carrier frequency (F1 or F2) changes during the measurements. During the comparison time window, the comparator 108 determines whether a count value received from the counter/timer module 104 is more or less than the threshold.

In some embodiments, the counter/timer module 104 generates an interrupt signal for application to the controller 105 after every nth pulse (or eighth pulse in this example) has been received from the zero crossing detector 101. This signifies the end of a single phase measurement.

In some embodiments, if a received counter value at the comparator 108 shows a significant change compared with a pre-set base-line value plus the threshold, a 'frequency out of range' interrupt is generated by the comparator and sent to the controller 105 On line 113. The data determination and protocol parsing circuit 114 is also notified accordingly.

Also in some embodiments, the data determination and protocol parsing circuit 115 generates an interrupt for application to the controller 105 every byte/package. For example, when an embodiment of the invention is configured for compliance with the Wireless Consortium WPC-QI protocol, when 8 bits (or 11 bits) of a packaged bit stream is parsed, a 'whole package generated' interrupt is generated and sent to the controller 105 on line 117.

Figure 2:
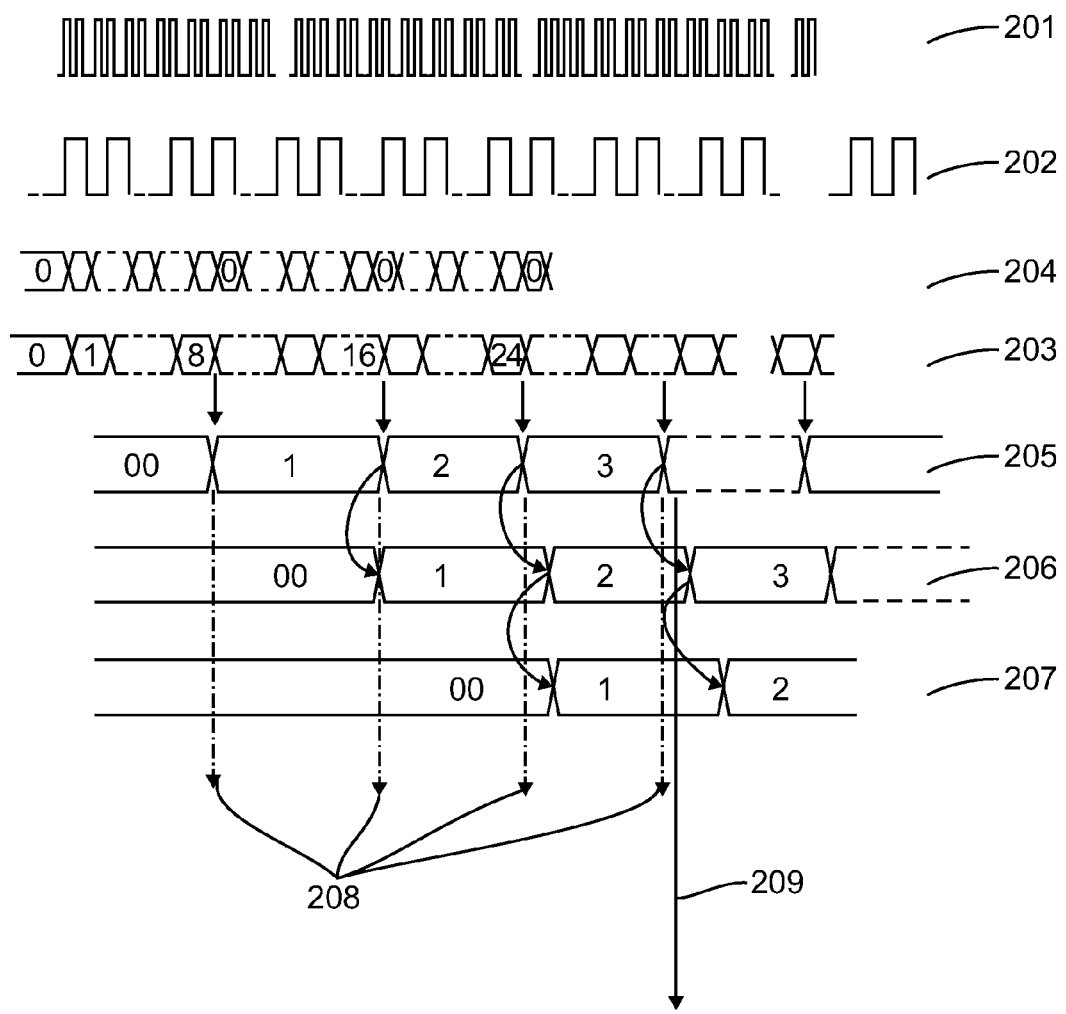
FIG. 2 is a timing diagram showing input signals and a counting operation in accordance with an embodiment of the invention.

In a further example, in a pipelined arrangement, multiphase measurements are carried out by the counter/timer module 100. FIG. 2 illustrates timing sequences for 'm' repeating count phases where in this example, 'm' is equal to 3. Trace 201 is the system clock signal and trace 202 is the square wave FSK signal arriving at the counter/timer module's input on line 103. In this example 8 cycles of the FSK signal are grouped together so that after every 8, 16, 24, etc cycles (see trace 203) of the FSK signal, the measured count value is uploaded to the registers 107. Each time eight FSK cycles have been timed the counter/timer 104 is cleared to 0 and the next count begins (trace 204). Trace 205 illustrates the first counting phase, 206 the second counting phase and 207 the third counting phase whereby a first phase ends and a following phase commences each time 8 consecutive FSK cycles have been received by the counter/timer. At the end of each phase an interrupt signal 208 is generated. A further interrupt signal 209 is generated at the end of each third phase. Arranging such a multiple phase counting scheme eases the controller's loading as it is feasible to generate the interrupt when the multiple measurement completes rather than a single measurement. Therefore, using 3-phase pipeline measurement, it is feasible to generate the interrupt to the controller when 24 cycles of FSK is measured instead of 8 cycles.

While in the above example, the counter/timer module 104 records a number of system clock cycles which elapse during the duration of the pre-chosen number, n, of consecutive pulses of the FSK pulsed waveform, in another embodiment, the counter/timer module measures the duration of the pre-chosen number, n, of consecutive pulses of the FSK pulsed waveform.

The present invention may also be implemented in a computer program for running on a computer system, at least including code portions for performing steps of a method according to the invention when run on a programmable apparatus, such as a computer system or enabling a programmable apparatus to perform functions of a device or system according to the invention.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Also, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Further, the entire functionality of the modules shown in FIG. 1 may be implemented in an integrated circuit. Such an integrated circuit may be a package containing one or more dies. Alternatively, the examples may be implemented as any number of separate integrated circuits or separate devices interconnected with each other in a suitable manner. An integrated circuit device may comprise one or more dies in a single package with electronic components provided on the dies that form the modules and which are connectable to other components outside the package through suitable connections such as pins of the package and bond wires between the pins and the dies.

The description of the preferred embodiments of the present invention has been presented for purposes of illustration and description, but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the spirit and scope of the present invention as defined by the appended claims.

The invention claimed is:

1. A frequency shift keying (FSK) demodulator for decoding a binary signal comprising data bits encoded in a received FSK signal, the demodulator comprising:
    a first comparator for processing the received FSK signal to produce a FSK pulsed waveform comprising a succession of pulses wherein one bit of data comprises 'N' pulses, wherein N is a positive integer greater than 1;
    a counter/timer, operably coupled to the first comparator, for receiving the FSK pulsed waveform and for determining measured count values of a duration of a pre-chosen number, n, where n is a positive integer and is less than N, of consecutive pulses of the FSK pulsed waveform;
    a second comparator, operably coupled to the counter/timer, for receiving the measured count values and for comparing the measured count values with a pre-determined threshold value and for outputting a bit value of '0' or '1' depending on the comparison; and
    a controller operably coupled to the counter/timer and to the second comparator for choosing the value 'n' and determining the threshold value.

2. The FSK demodulator of claim 1, wherein the second comparator compares the measured count values with the predetermined threshold value only when a change of frequency of the FSK pulsed waveform is expected.

3. The FSK demodulator of claim 1, wherein the first comparator is a zero crossing detector.

4. The FSK demodulator of claim 1, wherein a first logical value of a data bit of the binary signal is represented by the FSK pulsed waveform running at a constant frequency during a single bit period of N pulses and a second logical value of a data bit, being of opposite polarity to the first logical value, is represented by a change of frequency of the FSK pulsed waveform in the middle of a single bit period of N pulses.

5. The FSK demodulator of claim 1, wherein the counter/timer records a number of system clock cycles that elapse during the duration of the pre-chosen number, n, of consecutive pulses of the FSK pulsed waveform.

6. The FSK demodulator of claim 1, wherein the counter/timer measures the duration of the pre-chosen number, n, of consecutive pulses of the FSK pulsed waveform.

7. The FSK demodulator of claim 1, further comprising a parsing circuit operably coupled to the output of the second comparator for parsing an output bit stream received from the second comparator.

8. The FSK demodulator of claim 1, including at least one register for storing the measured count values.

9. The FSK demodulator of claim 3, wherein the zero crossing detector includes programmable hysteresis and a filter.

10. The FSK demodulator of claim 7, wherein the parsing circuit generates a first interrupt signal for application to the controller after a pre-determined number of bits of data has been parsed.

11. The FSK demodulator of claim 10, wherein the counter/timer generates a second interrupt signal for application to the controller after count values for 'n' consecutive pulses have been measured.

12. The FSK demodulator of claim 11, wherein the counter/timer operates a number 'm' of repeating count phases, wherein m is a positive integer, whereby a first phase ends and a following phase commences after 'n' pulses have been received by the counter/timer, and the counter/timer further generates a third interrupt signal for application to the controller at the end of each 'm'th phase.

13. A method for demodulating a frequency shift keying (FSK) signal, the method comprising:

processing, in a first comparator, the FSK signal to produce a FSK pulsed waveform comprising a succession of pulses wherein one bit of data comprises 'N' pulses, wherein N is a positive integer greater than 1;

in a counter/timer, receiving the FSK pulsed waveform and determining measured count values of a duration of a pre-chosen number, n, where n is a positive integer and is less than N, of consecutive pulses of the FSK pulsed waveform;

in a second comparator, comparing the measured count values with a pre-determined threshold value, and selecting a bit value of '0' or '1' depending on the comparison for outputting as a bit stream; and in a controller, choosing the value n and determining the threshold value.

14. The method of claim 13, wherein comparing the measured count values with the pre-determined threshold value is performed only when a change of frequency of the FSK pulsed waveform is expected.

* * * * *